United States Patent [19]

Lussier et al.

[11] Patent Number: 5,002,742

[45] Date of Patent: Mar. 26, 1991

[54] INORGANIC OXIDE SORBENTS FOR SULFUR OXIDES

[75] Inventors: Roger J. Lussier, Ellicott City; William A. Welsh, Fulton; James M. Masselli, Columbia, all of Md.

[73] Assignee: W. R. Grace & Co.-Conn., New York, N.Y.

[21] Appl. No.: 417,337

[22] Filed: Oct. 5, 1989

Related U.S. Application Data

[60] Division of Ser. No. 819,776, Jan. 16, 1986, abandoned, which is a continuation-in-part of Ser. No. 494,986, May 16, 1983, abandoned.

[51] Int. Cl.$^5$ .......................... B01J 8/00; C01B 17/00
[52] U.S. Cl. .................................................. 423/244
[58] Field of Search ........................ 423/244 R, 244 A

[56] References Cited

U.S. PATENT DOCUMENTS

| | | | |
|---|---|---|---|
| 1,839,062 | 12/1931 | Tellier . | |
| 2,536,122 | 1/1951 | Bertorelli et al. . | |
| 2,840,618 | 6/1958 | Hecht | 260/635 |
| 2,939,764 | 6/1960 | Schoentelder et al. | 23/143 |
| 2,939,765 | 6/1960 | Schoenfelder et al. | 23/143 |
| 2,992,884 | 7/1961 | Bieustock et al. | 23/2 |
| 3,184,414 | 5/1965 | Koch et al. | 252/455 |
| 3,235,512 | 2/1966 | Koepernik | 252/455 |
| 3,304,153 | 2/1967 | Bakker et al. | 23/52 |
| 3,425,956 | 2/1969 | Baker et al. | 252/455 |
| 3,451,949 | 6/1969 | Topsoe et al. | 252/455 |
| 3,619,131 | 11/1971 | Grabmaier | 23/52 |
| 3,629,153 | 12/1971 | Pryor | 252/463 |
| 3,655,330 | 4/1972 | Rettew et al. | 23/52 |
| 3,702,882 | 11/1972 | Rettew et al. | 423/600 |
| 3,791,992 | 2/1974 | Feldwick | 252/463 |
| 3,948,809 | 4/1976 | Norman et al. | 252/463 |
| 3,950,504 | 4/1976 | Belding et al. | 423/600 |
| 3,956,459 | 5/1976 | Whitman | 423/213.5 |
| 3,974,256 | 8/1976 | Wheelock et al. | 423/230 |
| 4,002,720 | 1/1977 | Wheelock et al. | 423/230 |
| 4,049,582 | 9/1977 | Erickson et al. | 252/466 PT |
| 4,071,436 | 1/1978 | Blanton et al. | 208/120 |
| 4,100,107 | 7/1978 | Wolk et al. | 252/443 |
| 4,115,251 | 9/1978 | Flanders et al. | 208/120 |
| 4,166,787 | 9/1979 | Blanton et al. | 208/120 |
| 4,206,039 | 6/1980 | Vasalos | 208/120 |
| 4,226,743 | 10/1980 | Seese | 252/453 |
| 4,234,457 | 11/1980 | Alafandi et al. | 252/438 |
| 4,243,556 | 1/1981 | Blanton | 252/455 Z |
| 4,248,739 | 2/1981 | Vaughan et al. | 252/455 Z |
| 4,259,176 | 3/1981 | Blanton et al. | 208/120 |
| 4,283,309 | 8/1981 | Gladrow | 252/455 Z |
| 4,452,908 | 6/1984 | Ball et al. | 502/61 |
| 4,456,703 | 6/1984 | Aldridge | 502/335 |
| 4,469,589 | 9/1984 | Yoo et al. | 208/120 |
| 4,472,267 | 9/1984 | Yoo et al. | 208/120 |
| 4,472,535 | 9/1984 | Chang et al. | 518/714 |
| 4,492,678 | 1/1985 | Yoo et al. | 423/244 |
| 4,510,257 | 4/1985 | Lewis et al. | 502/63 |
| 4,522,937 | 6/1985 | Yoo et al. | 502/302 |
| 4,601,997 | 7/1986 | Spuonello | 502/63 |
| 4,628,042 | 12/1986 | Speronello | 502/263 |
| 4,637,991 | 1/1987 | Battiste et al. | 502/68 |
| 4,716,136 | 12/1987 | Weisz et al. | 502/64 |
| 4,719,191 | 1/1988 | Battiste et al. | 502/84 |
| 4,735,704 | 4/1988 | Burk et al. | 423/244 |
| 4,830,840 | 5/1989 | Bhattacharyya | 423/244 |

FOREIGN PATENT DOCUMENTS

| | | |
|---|---|---|
| 0251564 | 1/1988 | European Pat. Off. . |
| 59-177131 | 10/1984 | Japan . |
| 560827 | 6/1977 | U.S.S.R. . |
| 983047 | 12/1982 | U.S.S.R. . |

OTHER PUBLICATIONS

Hackh's Chemical Dictionary, p. 632, 4 ed., 1969.

*Primary Examiner*—Gregory A. Heller
*Attorney, Agent, or Firm*—Arthur P. Savage

[57] ABSTRACT

Alkali metal and alkaline earth metal containing silica alumina spinel-mullite-gamma alumina sorbents which may be used to remove sulfur oxides ($SO_x$ components) from gas streams.

4 Claims, No Drawings

INORGANIC OXIDE SORBENTS FOR SULFUR OXIDES

This is a division of application Ser. No. 819,776, filed Jan. 16, 1986 now abandoned which is a continuation-in-part of our U.S. Pat. Ser. No. 494,986, filed May 16, 1983, now abandoned.

The present invention relates to the preparation of sorbents, and more particularly to inorganic oxide sorbent compositions which are particularly useful for the removal of sulfur oxides from gas mixtures.

Alumina-containing compositions have been used for many years to remove sulfur oxide components from gas streams such as stack gas.

U.S. Pat. Nos. 2,992,884 and 3,501,264 disclose the preparation and use of solid alkalized alumina adsorbents which are used to selectively remove sulfur components such as sulfur dioxide, sulfur trioxide, and hydrogen sulfide from flue gas.

U.S. Pat. Nos. 3,974,256 and 4,002,720 describe methods for removing hydrogen sulfide from gas mixtures wherein the sorbent capacity of a regenerable sorbent composition comprising alumina/rare-earths is increased by the addition of alkaline earth-metal promoter.

U.S. Pat. No. 4,259,176 describes the removal of sulfur oxides from cracking catalyst regeneration flue gas using a particulate solid alumina sorbent in the presence of a zeolite cracking catalyst which contains restricted quantities of silica.

U.S. Pat. No. 4,206,039 describes a fluid catalytic cracking process wherein the emissions of sulfur oxides are reduced by including a metallic reactant (typically alumina/ceria) that reacts to sulfur oxides in the regeneration zone.

Brindley and Nakahira, Journal of the American Ceramic Society, Vol. 42, No. 7, pp. 319-323, (1959) disclose that Kaolinite is converted to a material which contains an silica alumina spinel when heated to about 925° to 950° C. Furthermore, heating to temperatures of about 1050° C. results in the formation of a mullite phase. In both cases some of the silica in the kaolin is converted into a caustic soluble amorphous phase or at higher temperatures into crystobalite, a crystalline silica.

While it is generally recognized that alumina-containing sorbents may be used to remove sulfur containing components from gas streams, it is frequently found that the cost of an effective sorbent is excessive, particularly when used in the large quantities required for maintaining commercial applications such as stack-gas cleanup.

It is therefore an object of the present invention to provide effective low cost sorbent compositions.

It is another object to provide alumina-containing $SO_x$ sorbents that may be economically produced from low cost raw materials.

It is yet a further object to provide a method by which clay (kaolin) may be economically converted to a highly effective sorbent.

It is still another object to provide an improved method for removing $SO_x$ components from stack gas streams generated during the combustion of sulfur-containing hydrocarbons in processes such as power generation and cracking catalyst regeneration.

These and still further objects of the present invention will become readily apparent to one skilled in the art from the following detailed description and specific examples.

Broadly our invention contemplates a sorbent composition which comprises a silica alumina spinel-mullite-gamma alumina bound composite, wherein the spinel-mullite phase is characterized as having a silica to alumina ratio of below about 1.5, combined with an alkali-metal and/or alkaline earth metal.

More specifically, we have found that highly effective sorbents may be obtained by the following process.

1. Clay (preferably kaolin) and alumina sol (preferably chlorhydrol) are combined to obtain a formable mixture.

2. The mixture is formed into particles of desired shape and size, preferably by spray drying, to obtain particulate clay/alumina sol composites.

3. The composites are calcined at a temperature of about 1700°-2200° F., preferably about 1800° F., to convert the clay to spinel or spinel-mullite and amorphous silica, and the alumina sol component to a cohesive gamma alumina binder.

4. The calcined composites are reacted with an alkali metal hydroxide solution, preferably sodium hydroxide solution to solubilize and remove (leach) amorphous silica produced during calcination as solubilized alkali metal silicate.

5. The leached composites are then washed to remove residual solubilized silicate.

6. The washed composites are combined with alkali and/or alkaline earth metal components to convert the spinel/mullite/alumina particles to the preferred alkali or alkaline earth-metal exchanged, precipitated and/or impregnated form.

7. Alkali-metal and/or alkaline earth metal containing spinel-mullite-alumina composites may then be dried, and if desired, further processed, i.e. granulated, pilled, extruded or formed into spheres to obtain sorbent particles of desired shape, size and form.

8. The formed composites are finely activated at a temperature of from about 250° to 1800° F., either prior to or during use.

The finished alkali/alkaline earth-metal spinel-mullite-alumina composites (sorbent compositions) have the following characteristics.

(a) An alkali metal or alkaline earth-metal content of from about 1 to 15 percent by weight, calculated as $M_2O$ or $M^1O$ where M is an alkali metal such as sodium and potassium, and M is an alkaline earth metal such as calcium and magnesium which are included in ion exchanged, precipitated and/or impregnated form.

(b) Gamma-alumina binder content of from about 5 to 25 percent by weight calculated as $Al_2O_3$.

(c) A spinel content of from about 95 to 25 percent by weight, wherein the spinel component has a 2.0 to 0.40 $Al_2O_3 \cdot SiO_2$ mole ratio.

(d) A mullite content of from about 0 to 50 percent by weight, wherein the mullite component has a 3 $Al_2O_3 \cdot 2 SiO_2$ mole ratio.

In addition, the sorbent composition has the following physical characteristics:

(a) A surface area of from about 100 to 300 $m^2/g$ as measured by BET nitrogen absorbtion technique.

(b) A pore volume distribution which is characterized as follows:

(1) A total pore volume of from about 0.30 to 0.60 cc/g.

(2) A maximum number of pores in pores between 30 and 55 Å in diameter.

(3) Little or no pore volume in pores less than 20° Å in diameter.

(4) A pore volume distribution as follows: 0.15 to 0.40 cc/g in pores of less than 100 Å in diameter, 0.05 to 0.20 cc/g in pores ranging from 100 to 600 Å in diameter, and 0.05 to 0.20 cc/g in pores above 600 Å in diameter.

(c) Particle size:

(1) Ranging preferably from about 20 to 200 microns when the product is prepared in spray dried form.

(2) Ranging from 0.2 to 4 mm when the sorbent composition is prepared in forms of pills, granules, extrudates and spheres.

(3) A crush strength of from about 5 to 50 lbs as measured by two point crush on 32 mm extrudates.

(4) An attrition resistance characteristic of from about 2 to 20 as measured by the Davison Index (DI) and 0.2 to 2.0 Jersey Index (JI) as determined by the methods set forth in U.S. Pat. No. 4,247,420.

(d) X-ray Diffraction Pattern:

An X-ray diffraction pattern similar to that described by Brindley et al of material mostly in the silica-alumina spinel form or if calcined at a higher temperature may contain a high level of mullite. Typical X-ray patterns (using only the strongest peaks) for the materials are:

TABLE A

| $SiO_2$-$Al_2O_3$ Spinel | | Mullite | |
|---|---|---|---|
| 2 Theta | Intensity | 2 Theta | Intensity |
| 45.8 | 10 | 26.0 | 10 |
| 67.3 | 10 | 40.8 | 8 |
| 37.3 | 6 | 60.4 | 8 |
| 39.5 | 6 | | |
| 46.5 | 6 | | |

The compositions have a high capacity for the sorbtion of sulfur oxides. Typically the sorbent can sorb up to 25 percent of its initial weight as sulfur oxides (measured as $SO_2$). More specifically, the sorbents are evaluated using the so-called "$QSO_x$ Test" (described below), the "$QSO_x$ Number" or "$QSO_x$ Index" will typically range from 500 to 5,000 when tested at a level of 10 percent admixed with 90 percent of a commercial FCC catalyst which has a $QSO_x$ Index of less than 200.

$QSO_x$ test and $QSO_x$ number is determined as follows:

1. A catalyst/sorbent sample is steam deactivated for 6 hours at 1400° F. in 100% steam atmosphere at 5 PSI pressure prior to evaluation.

2. 10 g of the sample was placed in a furnace and heat treated one-half hour at 1250° F. in atmosphere comprising 2% $H_2$/98% $N_2$ to remove regenerable sulfur (if any) and residual moisture.

3. The sample is placed in an absorption device and a dynamic adsorption step is conducted at 1250° F. using $SO_2$ (900 PPM $SO_2$ in 4% $O_2$) with balance $N_2$ and a breakthrough profile is monitored.

4. A repeat of the dynamic adsorption step on the sulfur saturated sample obtained in (3) allows the $SO_2$ to $SO_3$ equilibrium conversion and the system lag to be determined.

5. The difference between the integrated responses from steps (3) and (4) yields a result that is proportional to the sulfur gain by the test sample and this is the $QSO_x$ number.

The compositions are particularly effective for removing $SO_x$ components of high temperature (500° to 1800° F.) stack gas. The $SO_x$ containing stack gases are typically generated by the burning of sulfur containing fossil fuels or during industrial processes such as employed in the high temperature regeneration, i.e. oxidation/burning, of organic sulfur-containing hydrotreating, cracking and hydrocracking catalysts.

In one preferred embodiment of the invention the sorbent composition is prepared and spray dried in microspheroidal form having a particle size predominantly in the range of from about 20 to 200 microns. The microspheroidal sorbent composition is then blended with conventional fluid catalytic cracking catalysts (FCC catalysts) in amounts ranging from about 20 to 250 parts by weight sorbent per 1000 parts by weight FCC catalyst. The FCC catalysts utilized in this embodiment of the invention are commercially available and typically comprise crystalline aluminosilicate zeolites such as rare-earth exchanged faujasite (type Y zeolites) and/or the ZSM type zeolites. The FCC catalysts are prepared in accordance with the methods typically disclosed in U.S. Pat. Nos. 3,867,308 and 3,957,689.

Having described the basic aspects of the present invention, the following examples are given to illustrate particular embodiments thereof.

EXAMPLE 1

Spray dried microspheres were prepared with 10 percent $Al_2O_3$ sol binder and 90 percent kaolin clay (dry basis) by slowly combining 10,465 g kaolin clay, 4,255 g chlorhydrol and sufficient $H_2O$ to obtain a pumpable slurry. The slurry was spray dried at a temperature of 325° F. (outlet air) the resulting microspheres were calcined for 1 hour at 1800° F. 500 g of the calcined microspheres were added to 1.0 l of water containing 225 g NaOH and boiled 1 hour under reflux with slow agitation. The slurry was filtered and washed with hot deionized water. The washed material was exchanged two times with 65 g $(NH_4)_2SO_4$ in 1.0 l water for one-half hour at 150° F. (pH adjusted to 5.0 with acid aluminum sulfate solution for the first exchange), washed with hot deionized water, and then oven dried. The sample was given a hydrothermal (steam) deactivation by heating for 6 hours at 1400° F. with 5 lbs. steam pressure, and then subjected to a $QSO_x$ test which measures total $SO_x$ pickup. The sorbent prepared in this example has $QSO_x$ number of 3366 (at 100% loading). The sorbent composition which is primarily in the H+ exchange form contained 73.9 weight percent $Al_2O_3$, 0.25 weight percent $Na_2O$ and the balance $SiO_2$.

EXAMPLE 2

This example indicates that a calcium exchanged version of the sorbent prepared as in example 1 demonstrated improved $SO_x$ pickup capability, i.e. a high $QSO_x$ number. A sample of the calcined, caustic leached microspheres obtained in example 1 was reslurried in water. The pH adjusted to 7.0 with 3 percent HCl solution and 100 g $CaCl_2$ was added. The mixture was held one-half hour at 150° F., filtered and washed with hot deionized water. The $CaCl_2$ exchange was repeated without pH adjustment. The slurry was filtered, washed with hot deionized water, and oven dried. The resulting sorbent composition contained 69.66 percent $Al_2O_3$ and 0.42 percent $Na_2O$, 2.84 weight percent CaO and the balance $SiO_2$. This sample had a $QSO_x$ number of 6038 (repeat 7716) at 100 percent loading after a 1400° F., 6 hour, 100% steam at 5 PSI pressure deactivation, indicating improved $SO_x$ pickup relative to the H+ form.

EXAMPLE 3

This example shows the improved $SO_x$ sorbing capability of a sorbent which is in a predominently sodium exchanged form. The starting microspheres for this sample were prepared from a slurry which contained 12.5 weight percent $Al_2O_3$ as $Al_2O_3$ sol (chlorhydrol having the composition 68.5% $H_2O$, 23.5% $Al_2O_3$, 8.0% Cl), and 87.5 weight percent kaolin. The slurry was spray dried in a large commercial dryer operated at a gas inlet temperature of 600° F. and outlet of 325° F. The microspheres were initially calcined at 1250° F. and then recalcined for one-half hour at about 1900° F. 250 g of the calcined microspheres were added to a solution of 125 g sodium hydroxide in 500 ml deionized water. The mixture was heated 1 hour under reflux, filtered, washed four times with 500 ml hot deionized water and oven dried. This sample which comprises 68.57 percent $Al_2O_3$, 2.72 percent $Na_2O$, balance $SiO_2$. The sorbent had a $QSO_x$ number of 14,659 at 100 percent loading after a 1400° F. hydrothermal deactivation for 6 hours at 5 PSI in 100% steam.

EXAMPLE 4

This example shows that a calcium impregnated material is very effective when used in a FCC catalyst blend. 750 g of calcined microspheres, prepared as described in Example 1, were added to 1.5 l of solution containing 300 g of NaOH and hot aged 1 hour at 170? F. with slow-mechanical agitation. The slurry was filtered and washed three times in 1.5 l deionized water. This material was exchanged three times in 1.5 l solution containing 150 g $(NH_4)_2SO_4$ for one-half hour at room temperature, with the pH adjusted to 7.0 with 10 weight percent $H_2SO_4$ on the first exchange only. After each exchange the sample was washed with deionized water. After oven drying overnight at 250° F., 38.8 g (dry basis) of the sample was impregnated with 21 ml solution containing 16.8 g $Ca(NO_3)_2 \cdot 4 H_2O$, dried at 250° F. and then calcined one hour at 1250° F. The sorbent sample contained about 9.4% CaO. 5 g of the sample was blended with 45.0 g of a commercial FCC catalyst (DA-300), steam deactivated and tested for $SO_x$ capability. The sorbent/catalyst sample was determined to have a $QSO_x$ number of 3,937, while the catalyst without sorbent had an average $QSO_x$ of about 200 for several tests.

EXAMPLE 5

This example shows that an alkaline earth oxide can be advantageously precipitated from solution onto a sorbent of this invention. 49.0 g (as is) of caustic leached microspheres prepared as in Example 1 were slurried in 100 ml of $H_2O$ containing 5.22 g $CaCl_2$, the pH adjusted to 10.0 with slow addition of 2M NaOH, filtered, washed three times with 200 ml deionized water, oven dried overnight at 250° F. and then calcined 1 hour at 1250° F. After a 1400° F. steam deactivation a 10% blend of the sorbent with a commercial FCC (DA-300) gave a $QSO_x$ of 927 versus 204 for the catalyst without sorbent.

The above examples clearly indicate that valuable, highly efficient $SO_x$ sorbent compositions may be obtained in using the present invention.

We claim:

1. A method for removing the $SO_x$ components from a gas stream which comprises contacting said gas stream with a sorbent composition comprising:
   (a) a silica alumina spinel-mullite having the X-ray diffraction pattern as set forth in Table A:

TABLE A

| $SiO_2$—$Al_2O_3$ Spinel | | Mullite | |
|---|---|---|---|
| 2 Theta | Intensity | 2 Theta | Intensity |
| 45.8 | 10 | 26.0 | 10 |
| 67.3 | 10 | 40.8 | 8 |
| 37.3 | 6 | 60.4 | 8 |
| 39.5 | 6 | | |
| 46.5 | 6 | | |

(b) from about 5 to 25 percent by weight gamma-alumina binder;
   (c) from about 1 to 15 percent by weight of an alkali and/or alkaline-earth metal selected from the group comprising sodium, potassium, magnesium, calcium and mixtures thereof measured as the oxide; and
   (d) a surface area in the range of from about 100 to 300 m²/g and a total pore volume of from about 0.03 to 0.60 cc/g.

2. The method of claim 1 wherein the sorbent has a particle size ranging from about 20 to 200 microns.

3. The method of claim 1 wherein the sorbent has a particle size of from 0.2 to 4 mm.

4. The method of claim 1 wherein the sorbent is included in a composition comprising a zeolite containing cracking catalyst and up to 50 percent by weight of the sorbent.

* * * * *